United States Patent [19]

Edwards et al.

[11] Patent Number: 5,011,254

[45] Date of Patent: Apr. 30, 1991

[54] COUPLING OF OPTICAL DEVICES TO OPTICAL FIBERS BY MEANS OF MICROLENSES

[75] Inventors: Christopher A. Edwards, Gilette; Herman M. Presby, Highland Park, both of N.J.

[73] Assignee: AT&T Bell Laboratories, Murray Hill, N.J.

[21] Appl. No.: 444,578

[22] Filed: Nov. 30, 1989

[51] Int. Cl.$^5$ ............................................. G02B 6/42
[52] U.S. Cl. ............................. 350/96.18; 350/96.15; 357/74
[58] Field of Search ............... 350/96.15, 96.17, 96.18, 350/96.20; 250/227, 552; 357/17, 19, 30, 74, 80

[56] References Cited

U.S. PATENT DOCUMENTS

| | | | |
|---|---|---|---|
| 4,269,648 | 5/1981 | Dakss et al. | 350/96.18 X |
| 4,386,268 | 5/1983 | Kock | 350/96.20 X |
| 4,386,821 | 6/1983 | Simon et al. | 350/96.20 |
| 4,399,453 | 8/1983 | Berg et al. | 350/96.21 X |
| 4,456,334 | 6/1984 | Henry et al. | 350/96.20 X |
| 4,710,605 | 12/1987 | Presby | 219/121 LT |

OTHER PUBLICATIONS

G-D. Khoe and H. G. Kock, "Laser-to Monomode Fiber Coupling and Encapsulation in a Modified To-5 Package", Journal of Lightwave Technology, vol. LT-3, No. 6, Dec. 1985, pp. 1315-1320.
J-I. Minowa, M. Saruwatary and N. Suzuki, "Optical Componentry Utilized in Field Trial of Single-Mode Fiber Long-Haul Transmission", IEEE Journal of Quantum Electronics, vol. QE-18, No. 4, Apr., 1982, pp. 1315-1320.
W. Bludau and R. H. Rossberg, "Low-Loss Laser-to-Fiber Coupling with Negligible Optical Feedback", Journal of Lightwave Technology, vol. LT-3, No. 2, Apr., 1985, pp. 294-302.
G. Wenke and Y. Zhu, "Comparison of Efficiency and Feedback Characteristics of Techniques for Coupling Semiconductor Lasers to Single-Mode Fiber", Applied Optics, vol. 22, No. 23, Dec. 1, 1983, pp. 3837-3844.
H. Kogelnik, "Coupling and Conversion Coefficients for Optical Modes", Proceedings of the Symposium on Quasi-Optics, Polytechnic Press, Brooklyn, New York, 1964, pp. 333-347.
H. Kogelnik and T. Li, "Laser Beams and Resonators", Applied Optics, vol. 5, No. 10, Oct., 1966, pp. 1550-1567.
M. Born and E. Wolf, Principles of Optics, 6th Ed. Pergamon Press, Oxford, 1959, pp. 212-214.
E. Hecht, Optics, 2nd Ed., Addison-Wesley, Reading, Mass., 1987, pp. 221-223.
K. Kawano, O. Mitomi and M. Saruwatari, "Laser Diode Module for Single-Mode Fiber Based on New Confocal Combination Lens Method", Journal of Lightwave Technology, vol. LT-4, No. 9, Sep., 1986.

(List continued on next page.)

Primary Examiner—John D. Lee
Assistant Examiner—Phan T. Heartney
Attorney, Agent, or Firm—Oleg E. Alber

[57] ABSTRACT

This invention is concerned with coupling optical energy efficiently by means of a microlens at an end of an optical fiber, the microlens being capable of improved coupling efficiency exceeding 55 percent (−2.5 dB), with coupling efficiencies of about 90 percent or more (less than 0.45 dB and as low as 0.22 dB loss) for uncoated lenses and of 95 percent or more for antireflection coated lenses being obtainable. An optimal microlens shape is substantially a hyperboloid of revolution having a relatively short focal length, f, e.g., for a mode radius of the optical device $\omega_0 = 1$ μm and a mode radius of the optical fiber $\omega_1 = 5$ μm, $f \approx 12$ μm. The microlens having the substantially hyperboloid of revolution shape may be produced by laser micromachinning technique. The optical fiber with the novel microlens at its end may be used in optical communication packages comprising the fiber and an optical device. The latter may be selected from semiconductor lasers and amplifiers, fiber amplifiers, pump sources for fiber amplifiers, and may include light receiving devices such as photodetectors.

41 Claims, 7 Drawing Sheets

OTHER PUBLICATIONS

P. D. Bear, "Microlenses for Coupling Single-Mode Fibers to Single-Mode Thin-Film Waveguides", Applied Optics, vol. 19, No. 17, Sep. 1, 1980, pp. 2906–2909.

L. G. Cohen and M. V. Schneider, "Microlenses for Coupling Junction Lasers to Optical Fibers", Applied Optics, vol. 13, No. 1, Jan., 1974, pp. 89–94.

K. Mathyssek, J. Wittman, R. Keil, "Fabrication and Investigation of Drawn Fiber Tapers with Spherical Microlenses", Journal of Optical Communications, vol. 6, No. 4, 1985, pp. 142–146.

U. C. Paek and A. L. Weaver, "Formation of a Spherical Lens at Optical Fiber Ends with a $CO_2$ Laser", Applied Optics, vol. 14, No. 2, Feb. 1975, pp. 294–298.

R. A. Abram, R. W. Allen and R. C. Goodfellow, "The Coupling of Light-Emitting Diodes to Optical Fibers Using Sphere Lenses", Journal of Applied Physics, vol. 46, No. 8, Aug. 1975, pp. 3468–3474.

Marshall C. Hudson, "Calculation of the Maximum Optical Coupling Efficiency into Multimode Optical Waveguides", Applied Optics, vol. 13, No. 5, May 1974, pp. 1029–1033.

O. Hasegawa, M. Abe and T. Yamaoka, "Efficient Coupling of LED and Sperical-Ended Fiber", J. Appl. Phys., vol. 49, No. 8, Aug. 1978, pp. 4353–4356.

John C. Ackenhusen, "Microlenses to Improve LED-to-Fiber Optical Coupling and Alignment Tolerance", Applied Optics, vol. 18, No. 21, Nov. 1, 1979.

R. K. Luneburg, Mathematical Theory of Optics, University of California Press, Berkeley and Los Angeles, 2nd Ed. 1966, pp. 129–138.

Eugene Hecht, Optics, 2nd Edition, Addison-Wesley, Reading, Mass., 1987, pp. 128–132 and 202–203.

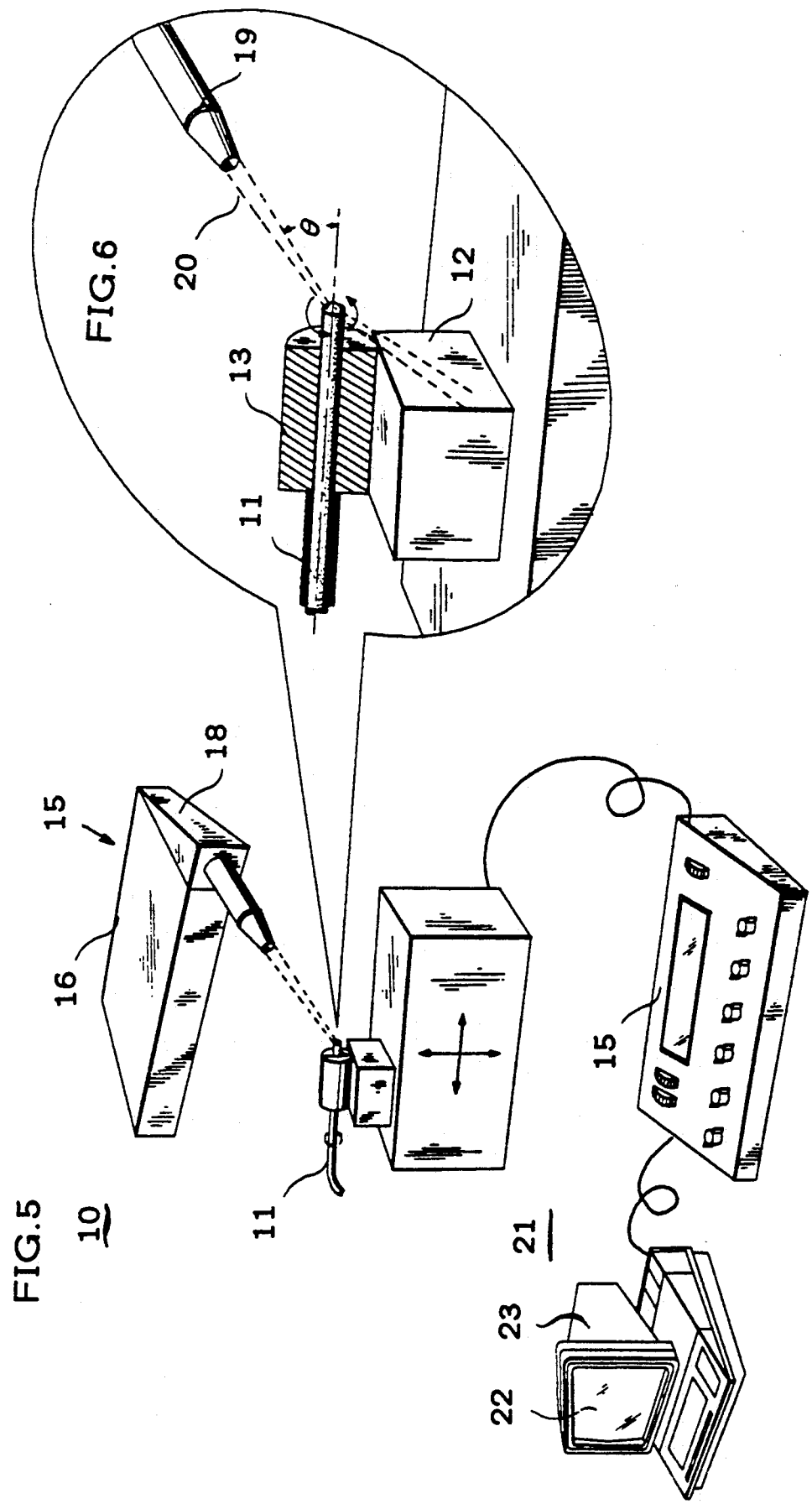

COUPLING OF OPTICAL DEVICES TO OPTICAL FIBERS BY MEANS OF MICROLENSES

TECHNICAL FIELD

This invention is concerned with the coupling of optical fibers with optical devices by means of microlenses.

BACKGROUND OF THE INVENTION

The wide-spread use of low-loss and low-dispersion single-mode optical fibers in the 0.8–1.6 μm wavelength region demands an efficient means of coupling power between optical fibers and optical devices, especially between a semiconductor laser or amplifier and the optical fiber. For example, an increase in the coupling efficiency and, thus, a decrease in the coupling loss between the laser and the fiber, permits increase in the repeater spacing in long-haul and submarine transmission systems. However, efficient coupling of semiconductor lasers to optical fiber has been a problem of general concern since the advent of optical fiber communications. Since the laser light power that can be launched into a single mode fiber suffers a loss of 7–11 dB via butt-joint coupling, coupling efficiency is universally improved either by the use of a microlens on the end of the fiber to match the modes of the laser and optical fiber or by bulk optics or by a combination of microlenses and bulk optics. Microlenses are more commonly used because of their ease of fabrication and packaging.

For communication, microlenses are very often used as parts of a communication package comprising an optical fiber and an optical device, such as a semiconductor laser at amplifier, optical fiber amplifier, optical fiber amplifier, or a pump for a fiber amplifier. The optical communication package may take many configurations and embodiments. One of these is shown in an article by G-D. Khoe et al. "Laser Monomode-Fiber Coupling" and Encapsulation in a Modified To-5 Package", Journal of Lightwave Technology, Vol. LT-3, No. 6, December 1985 pp. 1315–1320. Another example is disclosed in an article by J.-I Minowa et al., "Optical Componentry Utilized in Field Trail of Single Mode Fiber Long-Haul Transmission, IEEE Journal of Quantum Vol. QE-18, No. 4, April, 1982, pp. 705–717.

Microlenses are typically fabricated by tapering the fiber down to a point and melting the end. The tapering may be effected either by etching an end portion of the fiber in acid or by heating a section of the fiber and pulling-apart the heated section. The heating may be executed with a flame, an electric arc or a laser. The resultant microlenses are hemispherical in shape and, unfortunately, consistently demonstrate imperfect coupling, collecting typically less than 50 percent (−3 dB), and at best 55 percent (−2.5 dB) of the available laser radiation. The remainder of the light from the laser is lost.

U.S. application Ser. No. 07/333,230, filed Apr. 5, 1989 (Presby, H. M., Case 39) (U.S. Pat. No. 4,932,989), which is incorporated herein by reference, discloses a novel, laser-machining technique for producing arbitrarily shaped microlenses at the end of an optical fiber. While the production of microlenses by this technique is simplified and expedited, relative to the production of such microlenses by tapering technique, these microlenses still exhibit a relatively high coupling loss (e.g. 1.5–4.5 dB, see FIG. 5 of the patent application).

W. Bludau and R. H. Bossberg, in "Low-Loss Laser-to-Fiber Coupling with Negligible Optical Feedback", Journal of Lightwave Technology, vol. LT-3, No. 2, April 1985, pp. 294–302, describe an attempt to improve the laser-to-fiber coupling efficiency with simultaneous reduction in optical power feedback by changing the shape of the microlens from a hemispherical to aspherical (hyperbolic) form. The microlens was produced by a cumbersome multistep process that includes splicing a short length (about 1 mm) of a large diameter silica rod (d=240 μm) to a monomode fiber (core diameter typically 10 μm), heating the free end of the silica rod to produce a hemispherical lens with a diameter (d=355 μm) larger than the original diameter of the silica rod, tipping the center of the hemisphere with a droplet of pure quartz, and remelting the lens so that the droplet merges into the lens body with resulting lens shape approximating an aspherical lens shape. However, while this design led to the reduction in optical feedback, the improvement in coupling efficiency was not sufficiently advantageous, with coupling efficiency amounting to ≧40 percent, with the best value being only 70 percent. Therefore, it is still desirable to increase the coupling efficiency between an optical device and an optical fiber above and beyond the prior art results. Also, the microlenses should be reproducibly fabricated in a simple and expeditious way.

SUMMARY OF THE INVENTION

This invention is concerned with coupling optical energy efficiently between an optical device and an optical fiber by means of a microlens at an end of an optical fiber, with an optical communication package comprising an optical device, an optical fiber and a microlens at the end of the optical fiber facing the optical device, and with the production of a microlens capable of improved coupling efficiency exceeding 55 percent (−2.5 dB). Coupling efficiencies exceeding 70 percent, such as of 90 percent or more (less than 0.45 dB loss) for uncoated lenses and of 95 percent or more for anti-reflection coated lenses, are obtainable.

Universally used hemispherical microlenses typically show poor coupling performance. The present inventors have recognized that the poor coupling performance results from a combination of several loss-contributing factors including losses resulting from fiber truncation, mode-mismatch, spherical aberration, and Fresnel reflections. After realizing that the first three of these losses were due primarily to the hemispherical shape of the microlens, they have designed a microlens shape for optimal collection of radiation emanating from an optical device, such as laser. The optimal microlens shape is substantially a hyperboloid of revolution having a relatively short focal length, f, which is described by the following expression:

$$\frac{\left[z + \left(\frac{n_2}{n_1 + n_2}\right)f\right]^2}{\left(\frac{n_2}{n_1 + n_2}\right)^2 f^2} - \frac{\rho^2}{\left(\frac{n_1 - n_2}{n_1 + n_2}\right)f^2} = 1 \quad (1)$$

wherein z is a lens axial coordinate, $n_1$ and $n_2$ are each the index of refraction of the material of the lens and of the medium surrounding the lens, respectively, p is the axial coordinate, and f is the focal distance of the lens and is defined by the following expression:

$$f = \frac{\pi \omega_0 \omega_1^2}{\lambda \sqrt{\omega_1^2 - \omega_0^2}} \quad (2)$$

wherein $\omega_0$ is a mode radius of the optical device, $\omega_1$ is a mode radius of the optical fiber and $\lambda$ is the wavelength of illumination emanating from the optical device. Typical values of $\omega_0$ and $\omega_1$ yield a small focal length, e.g. $\omega_0 = 1$ μm and $\omega_1 = 5$ μm yield $f \approx 12$ μm. This microlens exhibits a very low coupling loss resulting in coupling efficiency exceeding 55 percent, preferably exceeding 70 percent, with 90 percent or more being most preferable. The loss is primarily due to reflections, which, for an ideal laser having symmetric Gaussian modes in x and y directions, is typically 0.22 dB for a laser mode radius $\omega_0 = 1$ μm, fiber mode radium $\omega_1 = 5$ μm and operating wavelength $\lambda = 1.3$ μm. By providing an anti-reflection coating on the microlens, it is possible, theoretically, to collect nearly 100 percent of the emitted energy.

The ability to capture in an optical fiber almost all of the light from a semiconductor laser has been only a fond hope until now. The use of hyperbolic microlenses designed in accordance with the present invention, can lead to considerable system improvement in nearly all communications systems. This not only applies when coupling optical fibers to semiconductor lasers but also to semiconductor amplifiers, fiber amplifiers and to pump sources for fiber amplifiers. A corresponding improvement in coupling efficiency when coupling light from an optical fiber with this microlens into a receiving device, such as a photodetector is also expected. The implications for improved system performance using the optimum microlens shape are varied and far-reaching, covering almost every area where fibers are coupled to optical devices, including lasers or amplifiers.

The hyperbolic microlens design is far superior for coupling to optical devices, such as typical semiconductor lasers, than are hemispherical microlenses, by as much as several dB. However, formation of a hyperbolic shape is non-trivial even in macroscopic optical components. Microscopic lenses such as these must have sub-micron precision in order to fully realize the coupling enhancement.

A recently developed technique for fabricating microlenses on an end of an optical fiber by laser micromachining described in U.S. patent application Ser. No. 07/333,230, filed Apr. 5, 1989 (U.S. Pat. No. 4,932,989), which is incorporated herein by reference, may be utilized to fabricate these hyperbolically shaped microlenses. This technique offers sufficient control for an efficient formation of the microlenses according to the present invention. In this process a fiber spinning about its longitudinal axis is moved into and about a narrowly focused laser beam which ablates the silica fiber much like a machinists tool removes material from a metal rod.

BRIEF DESCRIPTION OF THE DRAWING

The invention will be better understood after reading the following detailed description in conjunction with the drawings, wherein

FIG. 5: Discloses laser machining apparatus utilized in producing the microlenses on the end of an optical fiber.

FIG. 6: Discloses an enlarged view of a portion of the apparatus shown in FIG. 5.

LIST OF SYMBOLS

The symbols utilized herein are defined below.
$\omega$—1/e amplitude radius of the field (mode radius)
$\omega_o$—minimum mode radius of the laser
$\omega_1$—mode radius of the fiber
$\omega_2$—expanding mode radius of the laser
$\lambda$—wavelength illumination from the laser
f—lens focal distance
d—distance from laser front facet to lens
$R_L$—lens radius of curvature
$R_1$—radius of curvature of converging wavefront propagating from a fiber into the surrounding medium
$R_2$—radius of curvature of the diverging laser wavefront
$R_m$—lens radius with maximum loss due to spherical aberration
Z—lens axial coordinate ρ—lens radial coordinate
$\eta^2$—coupling coefficient between 2 modes
$\psi_1$—wavefunction of field within fiber
$\psi_2$—wavefunction of field emanating from laser
$n_1$—refractive index of lens material
$n_2$—refractive index of medium surrounding the lens (e.g., air)
$\theta_i$—angle of incidence
$\theta_t$—angle of transmission
$\theta_r$—angle of reflection
$\theta_a$—acceptance cone of hyperbolic lens (half angle).

DETAILED DESCRIPTION

This invention is concerned with coupling optical energy efficiently between an optical device and an optical fiber. This is accomplished by providing a microlens at the end of the optical fiber, which is capable of high coupling efficiency exceeding 55 percent, preferably exceeding 70 percent, most preferably on the order of about 90 percent.

The optimal microlens shape, derived after considering various limitations affecting the coupling efficiency of a hemispherical microlens and using ray tracing techniques, as shall be described below, is substantially a hyperboloid of revolution. These lenses demonstrate near optimal performance when coupling to lightwave sources. The non-coated microlens suffers primarily from reflection loss. Calculations show that non-coated aspheric lenses, limited solely by reflections, theoretically, suffer only about 0.22 dB loss when coupling to a typical laser having symmetric Gaussian modes in x and y directions. Coupling efficiency for a modal-symmetric semiconductor laser source and an anti-reflection coated microlens is expected to be 95 percent or greater.

Figure 1:
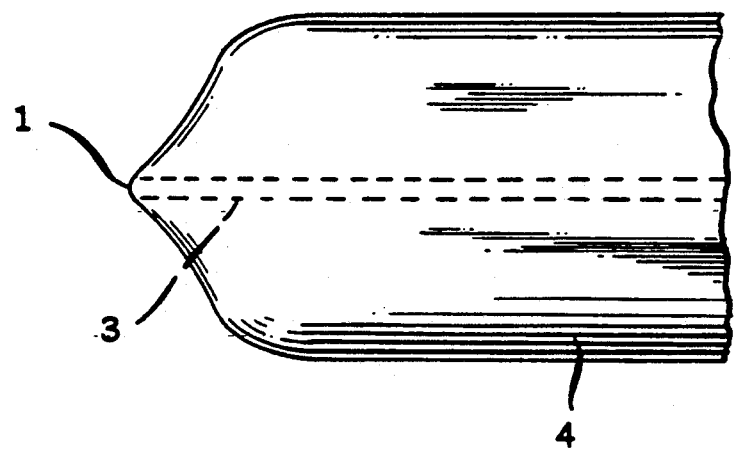
FIG. 1: Discloses a schematic representation of an optical fiber with a laser micromachined, hyperbolic microlens.

FIG. 1 discloses a schematic representation of an exemplary microlens 1 formed at an end portion of an optical fiber 2 comprising a core 3 and a cladding 4. In the illustrative embodiment, the optical fiber is a typical single mode optical fiber having a 5 μm silica-based core 3 and a 125 μm outer diameter cladding 4. The microlens lies within the boundries of the optical fiber and is coextensive with the core and at least some of the cladding.

Figure 2:
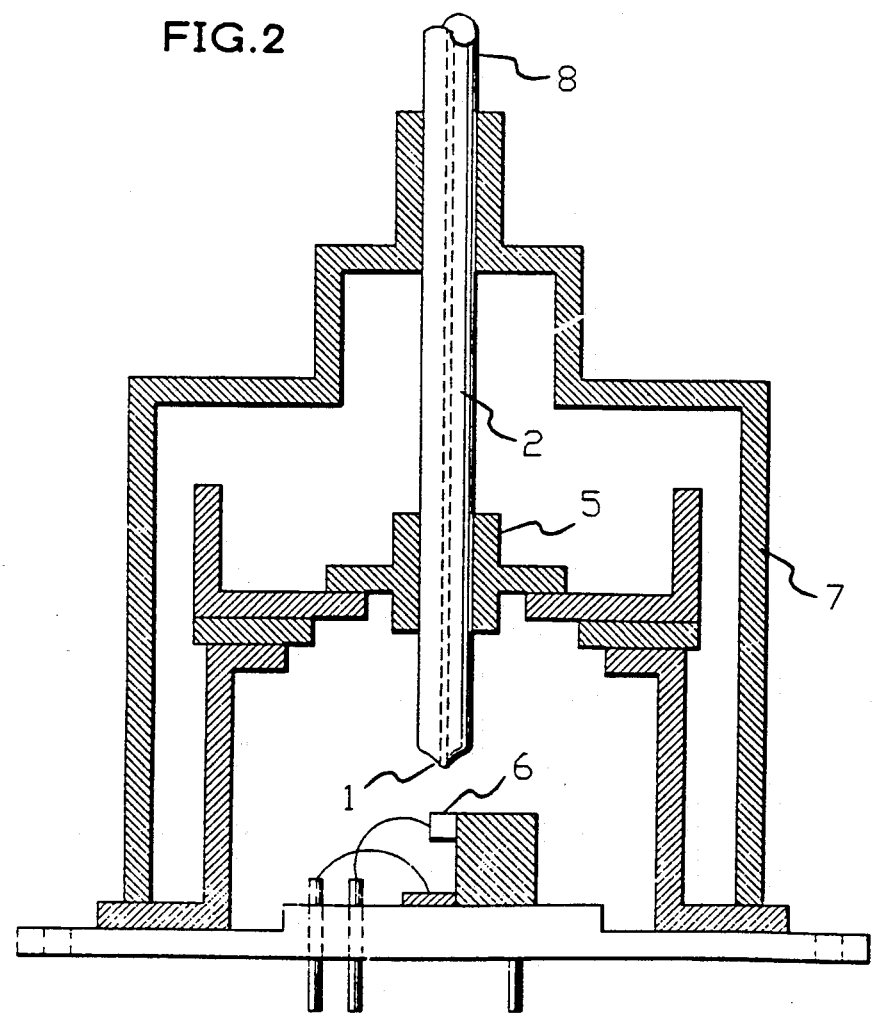
FIG. 2: Discloses a schematic cross-sectional representation of a typical optical communication package including a laser and an optical fiber with a microlens at an end portion facing the laser.

FIG. 2 discloses a schematic representation of a cross-sectional view of an illustrative laser-lens-optical fiber package useful in optical communication. A length of an optical fiber 2 with a microlens 1 at one end thereof is secured in a ferrule 5 and assembled in aligned relation with a laser 6 within a housing 7. A pigtail portion 8 of the fiber projecting from the housing may alone or with other pigtails be connected via a suitable connector (not shown) to a long haul optical fiber.

Figure 3:
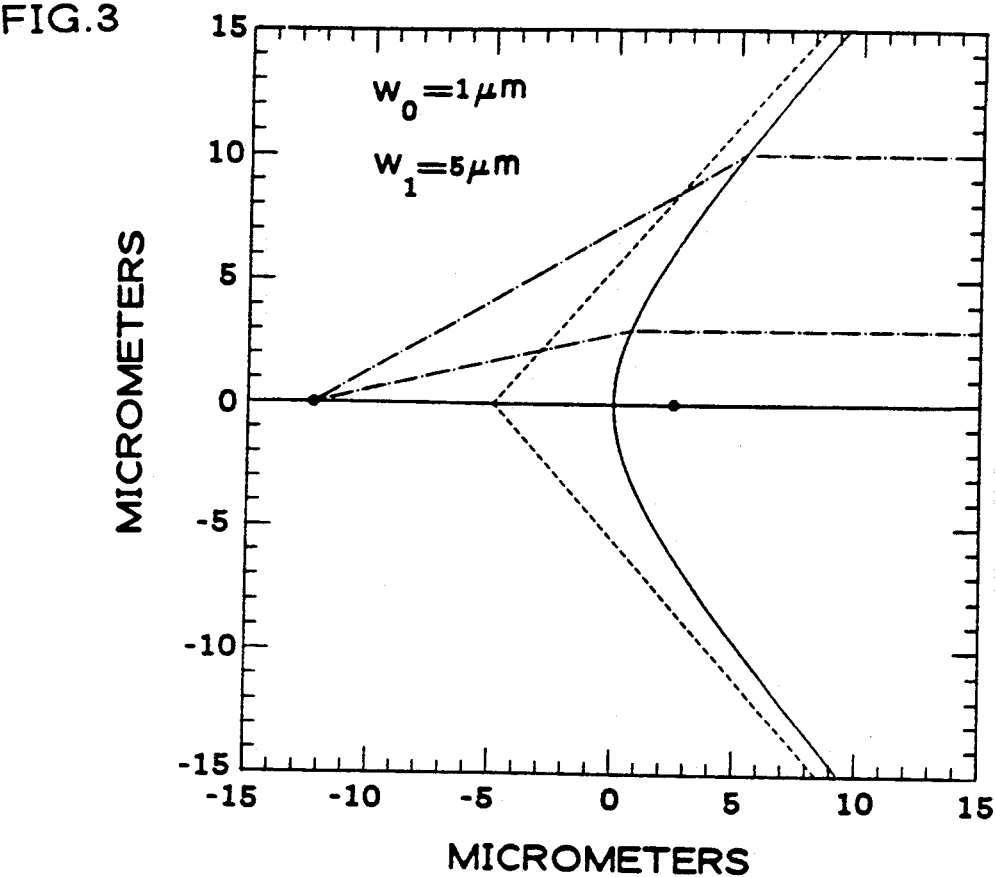
FIG. 3: Discloses a schematic representation of an exemplary ideal, hyperbolic microlens designed to match the mode of laser. Two off-axial rays are shown converging beyond the intersection of the asymptotes with no displacement due to aberration. In the illustrative example relevant parameters are: laser mode radius $\omega_0 = 1$ μm, optical fiber mode radius $\omega_1 = 5$ μm, and $\lambda = 1.3$ μm.

A schematic representation of a profile of an exemplary ideal hyperbolic microlens, produced in accordance with the present invention, is shown in FIG. 3. In the illustrative example, the lens shape that transforms a diverging spherical wave travelling from a laser into a plane wave is derived taking into consideration certain factors contributing to coupling losses in a hemispherical lens. The use of such a microlens for coupling an optical fiber to a laser results in excellent coupling efficiency as disclosed in FIG. 4. Therein is plotted the coupling efficiency between a laser and a matching hyperbolic microlens as a function of laser beam waist $\omega_0$, wherein $\omega_0$ is the mode radius of the laser (the curve is based on fiber mode radius $\omega_1 = 5$ μm and $\lambda = 1.3$ μm).

The microlens is described by the following expression:

$$\frac{\left[z + \left(\frac{n_2}{n_1 + n_2}\right)f\right]^2}{\left(\frac{n_2}{n_1 + n_2}\right)^2 f^2} - \frac{\rho^2}{\left(\frac{n_1 - n_2}{n_1 + n_2}\right)f^2} = 1 \quad (1)$$

wherein $$f = \frac{\pi \omega_0 \omega_1^2}{\lambda \sqrt{\omega_1^2 - \omega_0^2}} \quad (2)$$

Typical values of $\omega_0$ and $\omega_1$ yield a small focal length, e.g. $\omega_0 = 1$ μm, $\omega_1 = 5$ μm and $\lambda = 1.3$ μm yield $f \approx 12$ μm. Different $\omega_0$, $\omega_1$ and $\lambda$ values lead to different focal lengths. The microlens is formed directly on and monolithically with an end portion of an optical fiber. Preferably, the microlens is formed by laser micromachining utilizing a recently developed microlens fabricating technique disclosed in a copending U.S. application Ser. No. 07/333,230, filed in the name of H. M. Presby on Apr. 5, 1989, (H. M. Presby, Case 39) (U.S. Pat. No. 4,932,989) which is incorporated herein by reference. For illustration purposes, FIGS. 1 and 2 of that application are reproduced herein as FIGS. 5 and 6.

FIGS. 5 and 6 disclose an exemplary embodiment of an apparatus 10 for fabricating microlens 1 at the end of a single-mode optical fiber 11. To produce the microlens, a desired length of the fiber, stripped of insulation, is inserted into a bore in a holder 13, so that a portion of the fiber protrudes from the holder. The holder is fixed on a micropositioner 12 controlled either manually or via controller 15. The microlens is shaped by means of a narrow, pulsed laser beam 20 provided by a laser 15, such as a $CO_2$ or an excimer laser, having focusing means 16, 18 and 19 for focusing laser beam 20 onto the protruding end portion of the fiber rotating about its longitudinal axis. The laser beam engages the end portion of the fiber at an acute angle θ to the longitudinal axis of the fiber wherein $0° < \theta < 90°$. The laser micromachining is conducted by ablating in a preselected manner tiny portions of the fiber to produce a hyperbolically shaped microlens 1 at the end of the fiber. The micromachining removes only sufficient material to form the microlens while keeping the fiber truncation at a minimum. Control of the shape may be effected by an operator, e.g. by superimposing in a known manner an outline of a profile of the end of the fiber being shaped onto a templet profile of a desired lens shape on a screen, 22, such as the screen of a monitor 23, and laser micromachining the fiber so that the profile of the end portion corresponds with the templet profile on the screen. An example of a monitoring implement, including a long-range microscope coupled to a video camera and a monitor, is disclosed in U.S. Pat. No. 4,710,605 issued on Dec. 1, 1987 to Herman M. Presby, which is incorporated herein by reference. Alternatively, the lens shaping may be controlled by a computer program developed for obtaining a desired profile of the microlens.

A lens profile of a hyperbolic microlens fabricated under computer control by the laser micromachining technique, is as shown in FIG. 1. Microlens 1 approximates well a hyperbola at least about the core region of the fiber where the coupling occurs and may extend at least partially to the cladding region of the fiber. Numerous microlenses produced by the laser machining technique with a shape according to this invention have been evaluated by measuring optical power coupled into the fiber from different carefully calibrated semiconductor lasers. These lenses demonstrate near optimal performance when coupling to lightwave sources. Typically, uncoated lenses fabricated by the laser machining technique without feedback control, achieve less than 0.5 dB loss. With a more precise control over the laser machining, production of uncoated lenses with actual loss value matching the calculated coupling loss value of 0.22 dB on a reproducible basis is possible. Thus, reproducible fabrication of lenses with coupling efficiency of 90 percent, and greater, is feasible.

In the process of determining an optimum microlens shape, various loss-contributing factors of the universally used hemispherical microlenses were examined and coupling efficiency as a function of lens radius was calculated for a variety of laser parameters. The resulting analysis reveals that maximum coupling efficiency for typical systems with hemispherical microlenses is limited to about 56 percent ($-2.5$ dB), well in agreement with results reported by G. Wence and Y. Thu entitled "Comparison of Efficiency and Feedback Characteristics of Techniques for Coupling Semiconductor Lasers to Single-Mode Fiber", Applied Optics, Vol. 22, No. 23, Dec. 1, 1983 pp. 3837–3844.

The present inventors have recognized that poor coupling efficiency results from a combination of several possible loss-contributing factors including losses resulting from fiber truncation (FT), mode-mismatch (M), spherical aberration (A) and Fresnel reflections (R) and that, by eliminating these factors, a near-perfect light power coupling is possible. Hereinbelow are considered these possible sources of loss when coupling a laser to a hemispherical microlens, and their effects on coupling efficiency are quantitatively assessed. The 1e amplitude radius of the field is referred to as the mode radius, $\omega$, with $\omega_0$ and $\omega_1$ describing the laser and fiber mode radii, respectively. Typical illustrative system parameters used in this analysis are $\omega_0 = 1.0$ $\mu$m, $\omega_1 = 5.0$ $\mu$m, and $\lambda = 1.3$ $\mu$m. In the following analysis are assumed ideal, circularly symmetric, Gaussian field distributions for both the laser source and the fiber. To extend this analysis to non-symmetric distribution, one may simply add the loss due to any x-y mode anisotropy. In general, this additional loss is small; for example, a mode ratio $\omega_x/\omega_y = 0.8$ results in a coupling loss of about 0.2 dB.

COUPLING EFFICIENCY

Figure 7:
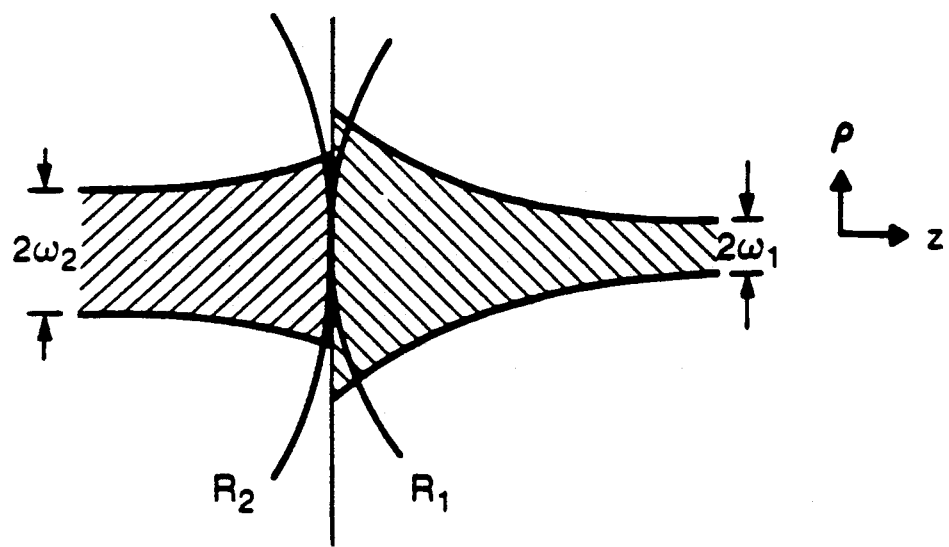
FIG. 7: Discloses coupling of two Gaussian modes with mode radii, $\omega_1$ and $\omega_2$, and phase fronts with radii of curvature, $R_1$ and $R_2$, respectively.

Before proceeding with an analysis of the individual losses, it is desirable to define coupling efficiency for two Gaussian modes. As shown in FIG. 7, $\omega_1$ represents mode radius of one Gaussian mode and $\omega_2$ represents mode radius of another. The coupled power from one mode to the other is given by $$\eta^2 = \frac{\left| \int_0^\infty \psi_1^*(\rho) e^{i2\pi P/\lambda} \psi_2(\rho) \rho d\rho \right|^2}{\int_0^\infty \psi_1(\rho)^2 \rho d\rho \cdot \int_0^\infty \psi_2(\rho)^2 \rho d\rho} \quad (3)$$

where $\psi_1 = e^{-\rho^2/\omega_1^2}$ and $\psi_2 = e^{-\rho^2/\omega_2^2}$ are the coupled wave functions, and $\rho = \sqrt{x^2 + y^2}$ is the radial coordinate. The phase factor, $e^{i2\pi P/\lambda}$, accounts for the phase mismatch between coupled nodes. See H. Kogelnik, "Coupling and Conversion Coefficients for Optical Modes", in Proceeding of the Symposium on Quasi-Optics, Polytechnic Press, Brooklyn, New York, 1964, pp. 333–347.

In a laser to fiber coupling arrangement, Eq. 3 is not immediately solvable. In this arrangement, $\omega_1$ represents the mode radius of the fiber; $\omega_0$ is the mode radius of the laser and $\omega_2$ is the mode radius of the expanding laser beam. As will become evident, the coupling dramatically depends on the shape and dimensions of the microlens.

Figure 8:
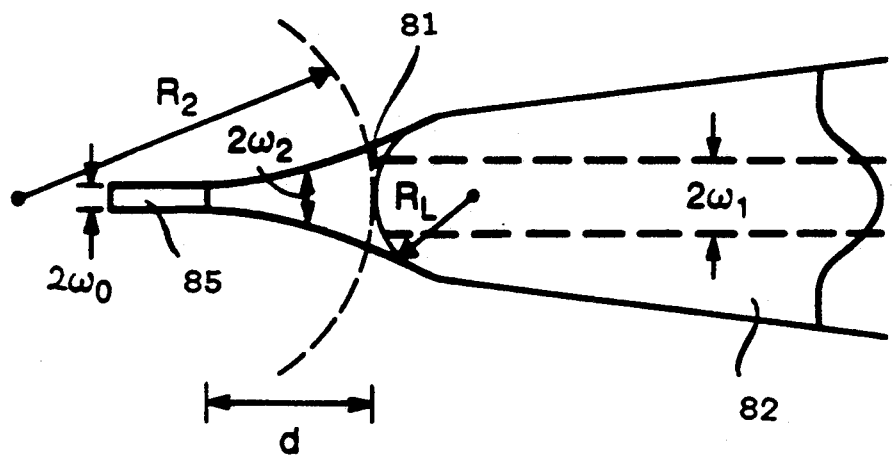
FIG. 8: Discloses a laser-to-microlens coupling scheme. As light propagates from the faccet of the semiconductor laser, the laser mode expands from its minimum radius $\omega_0$ to a larger value, $\omega_2$. The fiber has a mode radius $\omega_1$.

The laser-to-fiber coupling scheme is depicted in FIG. 8. Here, a lens 81 at the end of a tapered fiber, 82, is separated a distance d from a laser, 85, having a mode radius $\omega_0$. As light propagates from the front facet of the laser, the mode radius $\omega_0$ expands to a value $\omega_2$, and its phase front becomes spherical, with a radius of curvature, $R_2$. These two parameters are related by $$\omega_o^2 = \frac{\omega_2^2}{1 + \left(\frac{\pi \omega_2^2}{\lambda R_2}\right)^2}, \quad (4)$$

wherein $\lambda$ is an operating wavelength and $R_2$ is the radius of the phase front of the propagating light. See H. Kogelnik and T. Li, "Laser Beams and Resonators", Applied Optics, 5(1966), pp. 1550–1567. If one now imagines light traveling in the opposite direction, it is seen that a plane wave propagating within the fiber is transformed by lens 81 into a spherically converging wave. Ignoring aberrations, this wave has its own phase front that is also spherical with a radius of curvature, $R_1$. For a spherical lens, $R_1$ is given classically by the thin lens equation:

$$R_1 = f = \frac{R_L}{n - 1}, \quad (5)$$

wherein $R_L$ is the radius of the lens and n is the refractive index of the lens. See M. Born and E. Wolf, Principles of Optics, 6[th.] Ed., Pergamon Press, Oxford, 1959, pp. 212–214. Ignoring aberrations, optimum performance occurs when, i.e., the center of curvature of $R_2$ lies at the focal point of the lens so that $R_1 = R_2$. It is, thus, necessary to determine the $\omega_2$, the mode radius of an expanding laser beam, whose phase front matches the transformed phase front natural to the lens.

FIBER TRUNCATION (FT)

Figure 9:
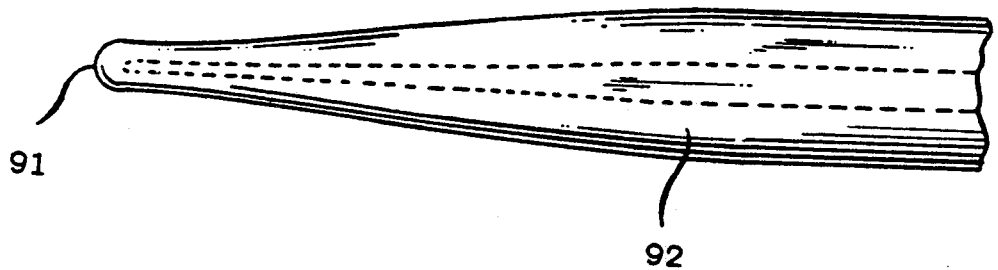
FIG. 9: Discloses a schematic view of a truncated optical fiber with a hemispherical microlens at the end of the truncated fiber. Approximate radius of curvature of the microlens is 10 μm.
Figure 10:
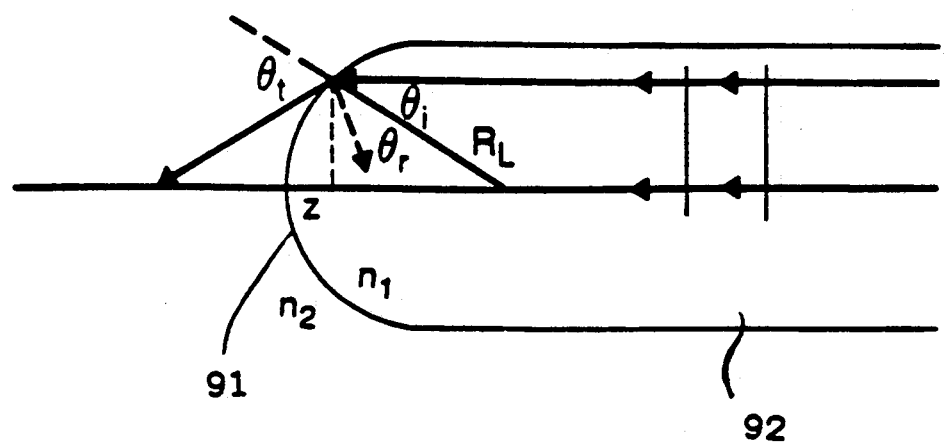
FIG. 10: Discloses an idealization of a hemispherical microlens.

First, is examined a loss source, called herein as the fiber truncation loss, that results from the small size of a hemispherical microlens with respect to the width of the mode of the laser. To realize the magnitude of this effect, a schematic representation of a typical hemispherical microlens, 91, at the end of a truncated fiber, 92, shown in FIG. 9 is examined. The shape of lens 91 is almost truly spherical, and it has a radius of curvature of roughly 10 $\mu$m. This lens is idealized in FIG. 10 where hemispherical lens 91 is shown at the end of a cylindrical rod 92.

A plane wave propagating within the cylinder 92 toward the lens, intersects the lens surface, whereafter the rays will both reflect and refract, with angles given by $$\theta_r = \theta_i = \tan^{-1}\left(\frac{dz}{d\rho}\right) \tag{6}$$

and $$\theta_t = \sin^{-1}\left(\frac{n_1 \sin\theta_i}{n_2}\right) \tag{7}$$

wherein $$z = R_L - \sqrt{R_L^2 - \rho^2}, \tag{8}$$

$n_1$ and $n_2$ are the refractive indices of the lens and surrounding materials, e.g. air, respectively and $\rho$ is the axial coordinate representing the distance from the optical axis to (or of an off-axial position from) a point where a ray intersects the lens surface.

As the distance, $\rho$, from the optical axis is increased, the angle of transmission $\theta_t$ increases, until it reaches a maximum of $\pi/2$. This occurs when the angle of incidence reaches the critical angle, $$\theta_c = \sin^{-1}\left(\frac{n_2}{n_1}\right). \tag{9}$$

For all angles greater than $\theta_c$, the incident light rays will be totally internally reflected. In three dimensions, $\rho = \rho_{max}$ describes a circle about the optic axis that acts as the boundary of an aperture. All rays that pass within the circle are accepted by the lens and transmitted; all other rays are rejected. From Eq. 9 and FIG. 10, one obtains for the critical radius, $$\rho_{max} = \frac{n_2 R_L}{n_1}. \tag{10}$$

This critical radius truncates the transmitted beam. Thus for a fiber where $n_1 = 1.46$ and $n_2 = 1.0$, less than 50 percent of the cross-sectional area of the lens can collect and transmit light. The same limiting aperture exists when one tries to couple light from the diverging laser beam into the fiber. The outer portion of the lens, beyond the critical limit, lies in the geometric shadow, and therefore cannot accept light from a laser.

This truncating radius defines the aperture in which all coupling is permitted. The coupling equation (Eq. 3) is thus to be evaluated, but with the integral in the numerator extending from $\rho = 0$ to $\rho = \rho_{max}$:

$$\eta_{FT}^2 = \frac{\left|\int_0^{\rho_{max}} \psi_1^*(\rho)\psi_2(\rho)\rho d\rho\right|^2}{\int_0^\infty \psi_1(\rho)^2 \rho d\rho \cdot \int_0^\infty \psi_2(\rho)^2 \rho d\rho}. \tag{11}$$

Figure 11:
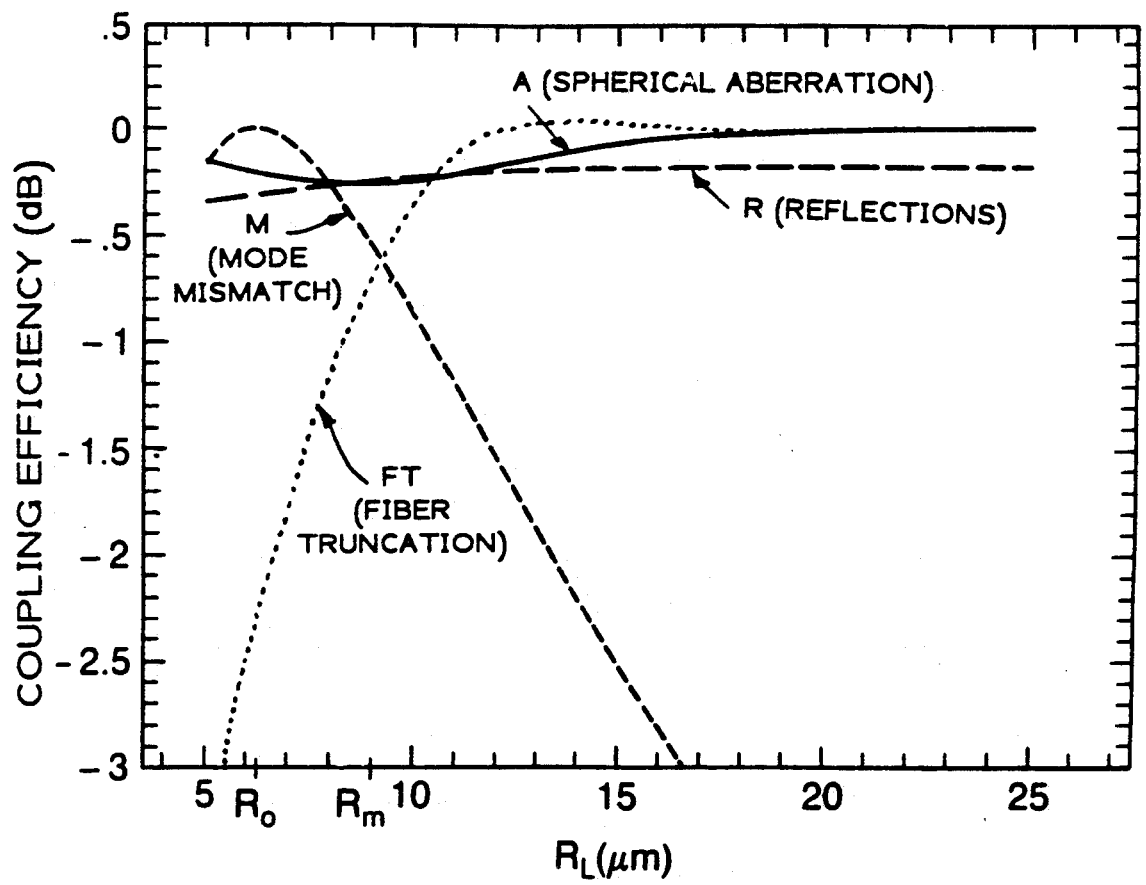
FIG. 11: Discloses coupling efficiency of a laser to a hemispherical microlens as a function of lens radius, $R_L$, for four sources of loss: Fiber Truncation, Mode-Mismatch, Spherical Aberration, and Fresnel Reflections. Relevant exemplary parameters: laser mode radius $\omega_0 = 1$ μm, fiber mode radius $\omega_1 = 5$ μm, and $\lambda = 1.3$ μm.

Setting $\psi_1 = \psi_2$, the coupling efficiency, $\eta_{FT}^2$, is calculated as a function of lens radius. This result is represented in FIG. 11 by the curve labeled FT-Fiber Truncation. Note that since a decreasing lens radius is accompanied by a shrinking aperture, at small radii the loss due to fiber truncation is very large. This loss is small for relatively large lenses (i.e., for lenses having a radius greater than about 18 μm), but such large lenses are incompatible with matching the modes and leads to the next limiting feature of the hemispherical microlenses: mode-mismatch.

MODE-MISMATCH (M)

A second source of loss results from mode-mismatch and is also strongly dependent on the lens radius. Ignoring aberrations, maximum coupling occurs when the center of curvature of the laser wavefront is located at the focal point of the spherical lens, defined by Eq. 5. For a given laser and lens, there is an optimum distance of separation, $d_o$. For distances less than this optimum, the wave continues to diverge as it propagates; for all distances greater than $d_o$, the rays reconverge, and then diverge.

Combining Eqs. 4 and 5 and setting $R_1 = R_2$, one finds that $\omega_2$ and the lens radius, $R_L$, are related by $$R_L = (n_1 - n_2)\frac{\pi\omega_2^2}{\lambda}\left(\frac{\omega_2^2}{\omega_0^2} - 1\right)^{-\frac{1}{2}}. \tag{12}$$

Using this expression to find the wave function, $\psi_2$, of the expanded laser mode, one can solve Eq. 3 numerically as a function of lens radius. This source of loss is represented in FIG. 11 by the curve labeled M-Mode-Mismatch. There is an optimum lens radius, $R_L = R_o$, at which the two modes match perfectly, and the loss is zero. For $\omega_0 = 1$, the optimum lens radius $R_0 = 6.25$ μm. However, for $R \neq R_o$, the two wave functions do not match and the loss increases rapidly. The mode-mismatch increases with focal distance which, in turn, increases with lens radius (Eq. 5), and for the large lens radius (if one would like to avoid Fiber Truncation) this loss becomes prohibitive.

SPHERICAL ABERRATION (A)

It is seen that significant losses are associated with both the fiber truncation and mode-mismatch. A third source of loss to consider is spherical aberration. It is well known that a principal limiting feature of spherical lenses is spherical aberration. See M. Born and E. Wolf, supra and E. Hecht, *Optics*, 2nd Edition (Addison-Wesley; Reading, Massachusetts, 1987), pp. 221-223.

Spherical aberration is the degree to which a coverging (or diverging) phase front is non-spherical. All spherically shaped lenses suffer from spherical aberration, particularly those whose rays pass far from the optic axis. This aberration results from the variation in optical path lengths from the focal point to a given planar wave front. Inclusion in the integral of Eq. 3 of an aberration factor $F = e^{i2\pi P/\lambda}$, where P is a phase error term, permits evaluation of the magnitude of the effect of spherical aberration on hemispherical microlenses.

Figure 12:
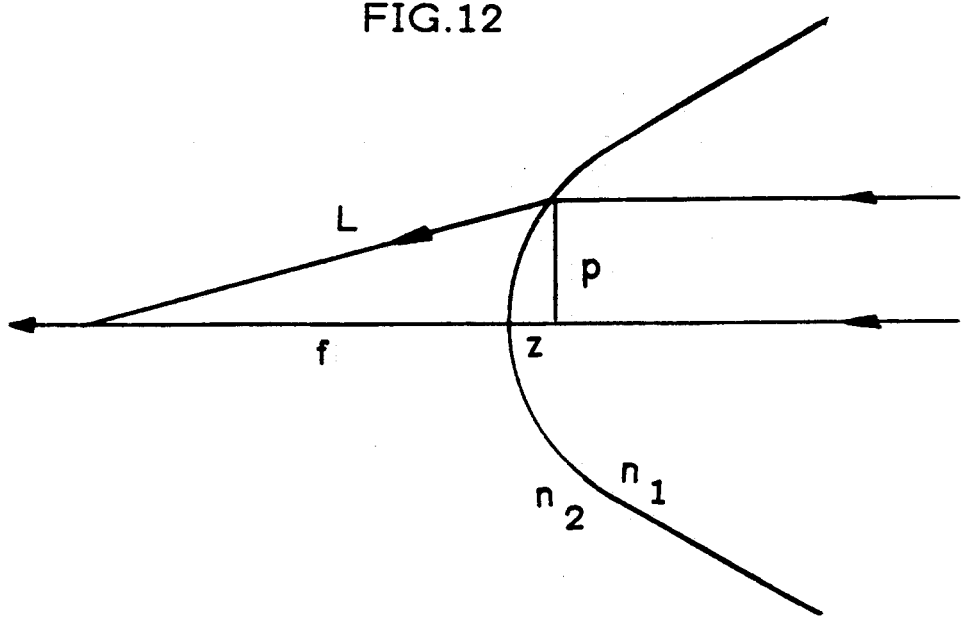
FIG. 12: Discloses a general hemispherical lens configuration for calculation of spherical aberration.

For two rays, one axial and one off-axis, propagating within the fiber toward the lens, as shown in FIG. 12, the phase error, P, can be calculated numerically as a function of an off-axial position, $\rho$, by combining the appropriate optical path lengths.

$$P = n_2 L - (n_1 z + n_2 f) \tag{13}$$

where $$L = \sqrt{\rho^2 + (z + f)^2}, \tag{14}$$

where $z=z(\rho)$ is the axial coordinate of the lens contour (Eq. 8) and f is paraxial focal length.

With spherical aberration included, Eq. 3 becomes $$\eta_A^2 = \frac{\left|\int_0^{\rho_{max}} \psi_1^*(\rho) e^{i2\pi P/\lambda} \psi_2(\rho) d\rho\right|^2}{\int_0^{\rho_{max}} \psi_1(\rho)^2 \rho d\rho \cdot \int_0^{\rho_{max}} \psi_2(\rho)^2 \rho d\rho}. \tag{15}$$

This equation, evaluated as a function of lens radius, is represented in FIG. 11, by the curve labeled A-Spherical Aberration. Note that the integrals extend only to $\rho_{max}$, as defined above in the section of Fiber Truncation, since only the rays that actually intersect the lens can suffer from this aberration.

As can be seen from the A-Spherical Aberration curve, the loss due to spherical aberration reaches a maximum at $R_L = R_m$. For radii less than $R_m$, power is lost by the truncation effect. For larger radii, the aperture increases, but the width of the beam stays constant. As a result, the beam passes through a smaller cross-section of the lens, restricted about the axis, where spherical aberration goes to zero. The magnitude of the maximum spherical aberration loss for these parameters is about 0.3 dB.

FRESNEL REFLECTIONS (R)

Another source of loss results from the Fresnel reflections at the lens surface. To calculate the effect of reflections on the coupling of two modes, a modified transmission coefficient of the lens is included as a factor in the coupling equation (Eq. 3). This lens coefficient can be approximated by the square root of the average of the parallel and perpendicular standard transmittivities:

$$t = \frac{\sqrt{T_\parallel} + \sqrt{T_\perp}}{2}, \tag{16}$$

where $$T_\parallel = \left(\frac{n_2 \cos\theta_t}{n_1 \cos\theta_i}\right)\left(\frac{2n_1 \cos\theta_i}{n_1 \cos\theta_t + n_2 \cos\theta_i}\right)^2 \tag{17}$$

and $$T_\perp = \left(\frac{n_2 \cos\theta_t}{n_1 \cos\theta_i}\right)\left(\frac{2n_1 \cos\theta_i}{n_1 \cos\theta_i + n_2 \cos\theta_t}\right)^2 \tag{18}$$

(See M. Born and E. Wolf, Supra). The angles of incidence and refraction are as given in Eqs. 6 and 7. Substituting this factor into Eq. 3, we obtain:

$$\eta_R^2 = \frac{\left|\int_0^{\rho_{max}} \psi_1^*(\rho) t \psi_2(\rho) d\rho\right|^2}{\int_0^{\rho_{max}} \psi_1(\rho)^2 \rho d\rho \cdot \int_0^{\rho_{max}} \psi_2(\rho)^2 \rho d\rho} \tag{19}$$

Again note that the integrals extend only to $\rho_{max}$.

Setting the two wave functions equal, Eq. 19 is solved numerically and the results are represented by the curve in FIG. 11 labeled R-Reflections. The smallest radius yields the greatest loss since this lens has the greatest average angle of incidence, and therefore, the greatest reflection. As the lens radius increases, the curve approaches $\eta_R^2 = -0.15$ dB, which is the loss at a planar interface.

TOTAL COUPLING EFFICIENCY OF A HEMISPHERIC LENS

Figure 13:
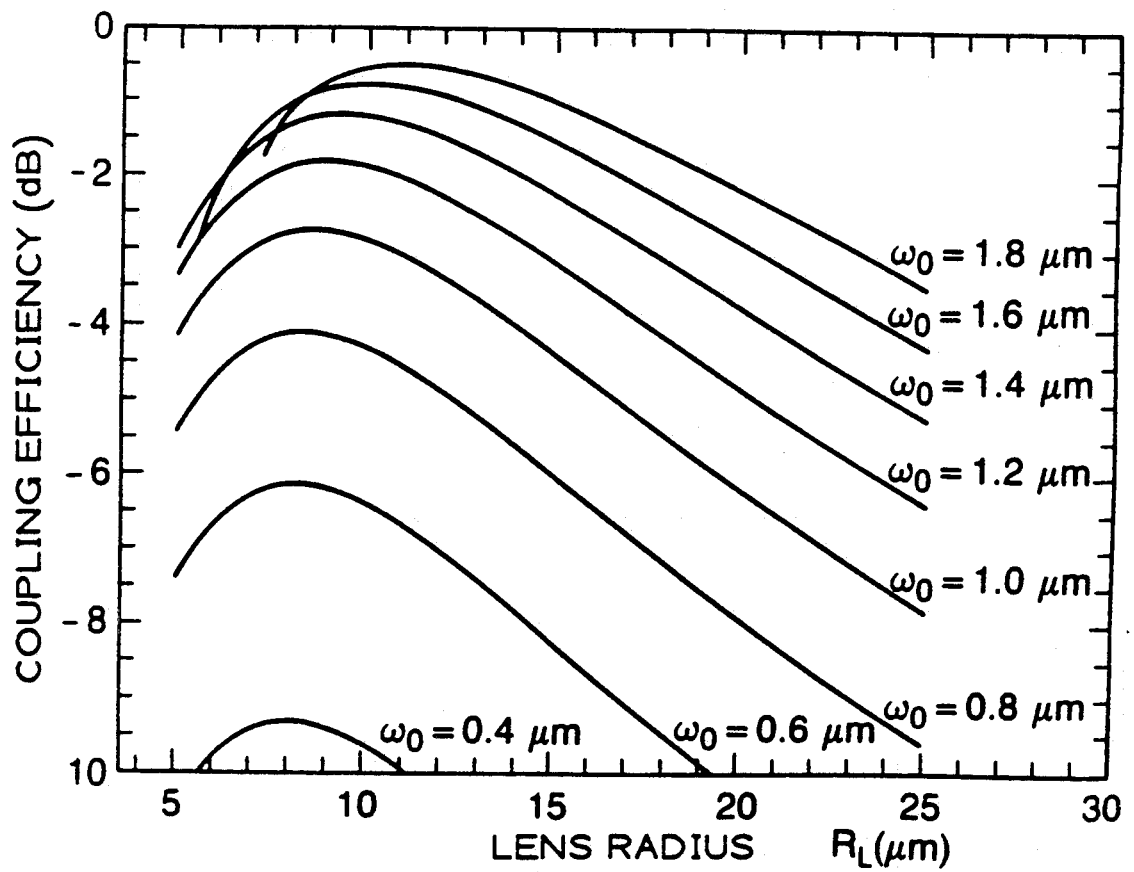
FIG. 13: Discloses total coupling efficiency of a laser to hemispherical microlenses as a function of lens radius, $R_L$, for various laser mode radii $\omega_0$, fiber mode radius $\omega_1 = 5$ μm, and $\lambda = 1.3$ μm.

All of the above effects are now included in a complete coupling efficiency equation $$\eta^2 = \frac{\left|\int_0^{\rho_{max}} \psi_1^*(\rho) e^{i2\pi P/\lambda} \bar{t} \psi_2(\rho) d\rho\right|^2}{\int_0^{\infty} \psi_1(\rho)^2 \rho d\rho \cdot \int_0^{\infty} \psi_2(\rho)^2 \rho d\rho} \tag{20}$$

where P is the phase factor (Eq. 13) and $\bar{t}$ is the modified transmission coefficient (Eq. 16). Solving Eq. 20 for a variety of lens/laser parameters generates a series of universal curves that show the best possible performance of hemispherical lenses for laser coupling. One such family of curves is represented in FIG. 13 by plotting coupling efficiency as a function of lens radius for different ratios of laser to fiber mode radii, and an operating wavelength $\lambda = 1.3$ μm.

The significance of these curves becomes evident when looking at typical system parameters, in which laser mode radius $\omega_0 = 1$ μm, fiber mode radius $\omega_1 = 5$ μm, and $\lambda = 1.3$ μm. For these values the maximum coupling efficiency possible with an ideal, circularly symmetric Gaussian laser output is $-2.75$ dB. This value, which agrees well with reported results (e.g. by G. Wenke and Y. Zhu, supra), demonstrates the severe loss penalty paid when using hemispherical microlenses for coupling schemes.

DERIVATION OF AN IDEAL LENS AND ITS COUPLING EFFICIENCY

As shown above, the 2.75 dB coupling loss inherent in hemispherical microlenses results from at least the following factors: fiber truncation, mode-mismatch, spherical aberration, and Fresnel reflection. In the pursuit of maximum coupling efficiency, it is necessary to remove, or at least reduce, these sources of loss. Fresnel reflection can be reduced with an appropriate anti-reflection (AR) coating. The other three sources of loss, namely, spherical aberration, fiber truncation and mode mismatch, should also be removed so that the idealized microlens will have a large numerical aperture to collect all the laser radiation, will have a focal distance that perfectly matches the laser and fiber modes and should be free of spherical aberration.

The ideal lens shape is derived by first eliminating spherical aberration. An aberration-free lens has all rays converging at the focus in phase; that is, all optical path lengths from a given wave front to the focus are equal. Setting the phase error to zero we obtain $$n_2 L = n_2 f + n_1 z \tag{21}$$

where L is given by Eq. 14. Equations 14 and 21 can be reduced to yield $$\frac{(z+a)^2}{a^2} + \frac{\rho^2}{b^2} = 1, \tag{22}$$

-continued wherein $$a^2 = \left(\frac{n_2}{n_1 + n_2}\right)^2 f^2 \quad (23)$$

and $$b^2 = \left(\frac{n_1 - n_2}{n_1 + n_2}\right) f^2. \quad (24)$$

Thus, the ideal lens shape depends on the relative values of the two refractive indexes. For $n_2 > n_1$, Eqs. 22-24 describe an ellipse. However, in a laser to fiber coupling scheme, the index of the lens medium, $n_1$, is greater than that of the surrounding material, $n_2$,; therefore a hyperbola is the ideal lens shape to eliminate spherical aberration.

While the greatest benefits will be obtained when the shape of the microlens comprises a hyperboloid of revolution, clearly, results which are less than optimal but still beneficial can be obtained with shapes which are only substantially a hyperboloid of revolution. For the purposes of this invention, the shape of the microlens is said to be substantially a hyperboloid of revolution when the shape satisfies equations 22, 23 and 24, with a and b varying from the values given in those equations by an amount which still permits substantial removal of light coupling losses, as defined in this application, arising from at least fiber truncation, mode mismatch and spherical aberration.

Having derived the shape of the ideal microlens, one can calculate its expected performance. The lens shape is shown in FIG. 3 along with its hyperbolic asymptotes and two rays. Unlike the hemispherical microlens, the hyperbolic microlens will not suffer fiber truncation loss. Unlike the hemispherical lens surface, the entire surface of the hyperbolic lens is accessible from the focal point. The hyperbolic lens, however, does have an acceptance cone; for a sufficiently divergent source, some rays that leave the focus will not intersect the lens at all. The acceptance cone is traced out by the hyperbolic asymptotes and is given by $$\theta_a = \tan^{-1}\left(\frac{b}{a}\right). \quad (25)$$

Using $n_1 = 1.45$, $n_2 = 1.0$, $\omega_0 = 1$ μm and $\omega_1 = 5$ μm in Eqs. 2, 23, 24 and 25, one obtains $\theta_a \simeq 43°$. A $\lambda = 1.3$ μm laser source would need to have a mode radius, $\omega_0 < 0.55$ μm in order to have noticeable loss due to the non-intersected radiation. (See H. Kogelnik and T. Li, supra). Although there also exists an acceptance cone with the hyperbolic lens, it is so large as to not be a factor for most semiconductor light sources.

Finally, it is investigated if the hyperbolic microlens can perfectly match the modes of the laser and fiber. As seen in Eqs. 21 and 22, both a and b depend linearly on the classical focal distance, f. As a result, the focal distance depends solely on the scale of the lens. Coupling to a laser, the focal distance depends on $\omega_0$, $\omega_1$, and $\lambda$, and is obtained by solving Eq. 4 with $R_2 = f$. Thus the scale of the lens can be adjusted to fully eliminate mode-mismatch.

Figure 4:
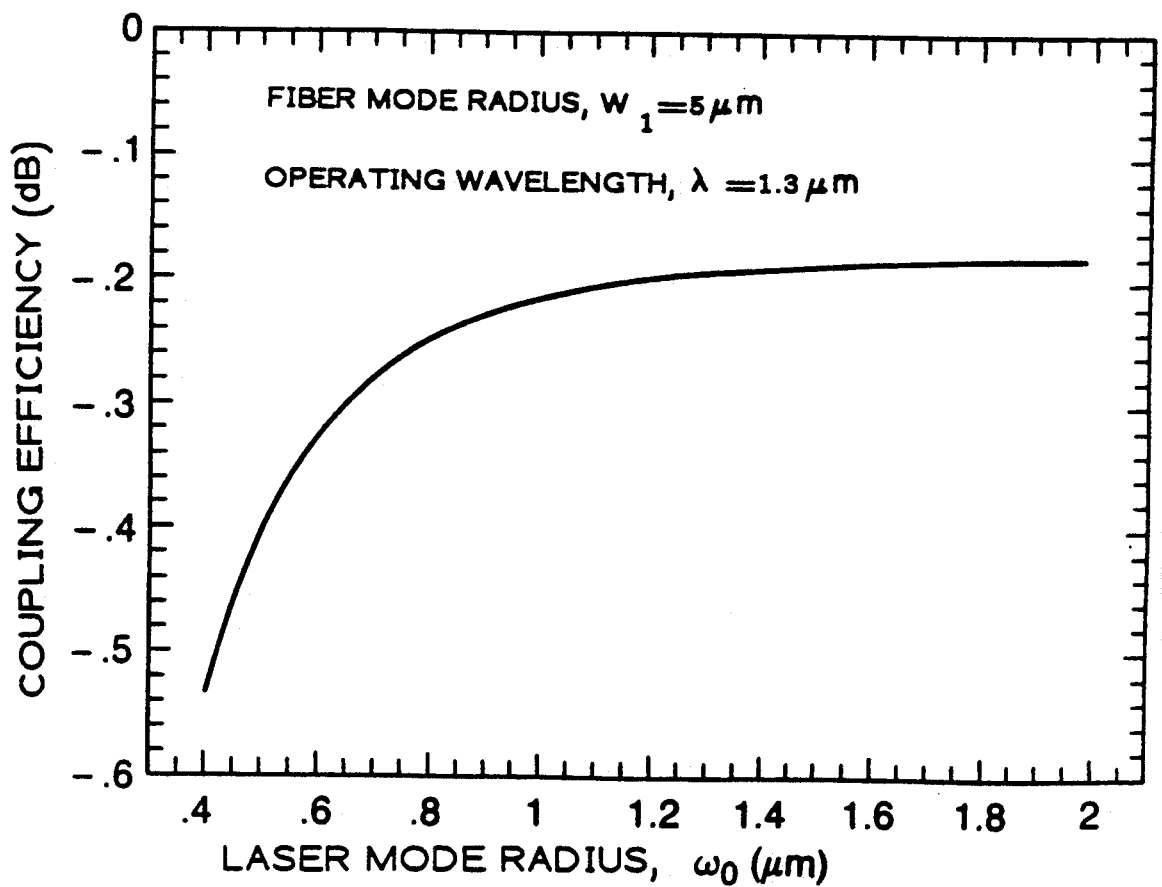
FIG. 4: Discloses total coupling efficiency of a laser to its matching hyperbolic microlens as a function of laser mode radius, $\omega_0$, for a fiber mode radius $\omega_1 = 5$ μm, and $\lambda = 1.3$ μm.

The only remaining loss to consider is reflection, which can of course be removed with an anti-reflection coating. However, for the case of a non-coated lens, one can calculate coupling efficiency including reflection losses. In a manner similar to that used with the hemispherical microlens, one can solve $$\eta^2 = \frac{\left|\int_0^\infty \psi_1^*(\rho) t \psi_2(\rho) \rho d\rho\right|^2}{\int_0^\infty \psi_1(\rho)^2 \rho d\rho \cdot \int_0^\infty \psi_2(\rho)^2 \rho d\rho}, \quad (26)$$

where $t$ is the transmission coefficient given in Eqs. 16-18. The angles of reflection and refraction are as given in Eqs. 6 and 7, with z describing the hyperbolic geometry (Eq. 20). The integrals in Eq. 26 extend from zero to infinity since there is now no fiber truncation effect. The coupling loss for a non-coated hyperbolic microlens is shown in FIG. 4 as a function of the laser mode, $\omega_0$. For, typically, laser mode radius $\omega_0 = 1.0$ μm, fiber mode radius $\omega_1 = 5$ μm and operating wavelength $\lambda = 1.3$ μm, a coupling loss is indicated as being about 0.22 dB.

While particular embodiments of the present invention have been shown and described, it will be obvious to those skilled in the art that various changes and modifications may be made without departing from the invention in its broader aspects.

We claim:

1. An optical communication package comprising an optical device, an optical fiber and a microlens for improving coupling of optical power between the optical fiber and the optical device, in which said microlens lies within the boundaries of the fiber and has a contour shape selected so that light coupling losses arising from at least fiber truncation, mode mismatch and spherical aberration are substantially removed, the contour shape of said microlens comprises substantially a hyperboloid of revolution which is described by the following expression:

$$\frac{\left[z + \left(\frac{n_2}{n_1 + n_2}\right)f\right]^2}{\left(\frac{n_2}{n_1 + n_2}\right)^2 f^2} - \frac{\rho^2}{\left(\frac{n_1 - n_2}{n_1 + n_2}\right)f^2} = 1$$

wherein z is a lens axial coordinate, $n_1$ and $n_2$ are each the index of refraction of the material of the lens and of the medium surrounding the lens, respectively, $\rho$ is the axial coordinate and f is the focal distance of this lens defined by the following expression:

$$f = \frac{\pi \omega_0 \omega_1^2}{\lambda \sqrt{\omega_1^2 - \omega_0^2}}$$

wherein $\omega_0$ is a mode radius of the optical device, $\omega_1$ is a mode radius of the optical fiber and $\lambda$ is a wavelength of the optical power being coupled.

2. The package of claim 1, in which said mode radius $\omega_0$ of the optical device is equal to 1 μm, the mode radius $\omega_1$ of the optical fiber is equal to 5 μm, the operating wavelength $\lambda$ of the light energy being coupled is equal to 1.3 μm, and the focal length of the microlens is $\simeq 12$ μm.

3. The package of claim 1, wherein said microlens comprises a convex end portion of the optical fiber, the contour of the said convex end portion of the fiber comprising substantially a hyperboloid of revolution.

4. The package of claim 3, wherein the optical fiber comprises a core and a cladding and wherein substantially the entire core portion of the convex end portion of the fiber comprises substantially the hyperboloid of revolution.

5. The package of claim 4, wherein at least a part of the cladding portion of the convex end portion of the fiber comprises substantially a portion of the hyperboloid of revolution.

6. The package of claim 1, in which said removal results in coupling efficiency exceeding 70 percent of the optical power being coupled.

7. The package of claim 1, in which said removal results in coupling efficiency of about 90 percent of the optical power being coupled.

8. The package of claim 1, in which said removal of coupling losses further includes provision of an anti-reflection coating on the microlens to substantially remove Fresnel reflections of the microlens.

9. The package of claim 1, in which said optical device is selected from the group of optical devices consisting of lasers, semiconductor amplifiers, optical fiber amplifiers and pump sources for fiber amplifiers.

10. The package of claim 1, in which said optical device is a laser.

11. The package of claim 1, in which the wavelength, $\lambda$, of the optical power being coupled is within a range of from 0.8 to 1.6 $\mu$m.

12. The package of claim 11, in which said operating wavelength $\lambda$ is equal to 1.3 $\mu$m.

13. The package of claim 1, in which said mode radius $\omega_0$ of the optical device is equal to 1 $\mu$m, and said mode radius $\omega_1$ of the optical fiber is equal to 5 $\mu$m.

14. A process of coupling optical power with an optical fiber, which comprises improving coupling of the optical power by means of a microlens which lies within the boundaries of the optical fiber, said improvement being effected by selecting a contour shape of the microlens so as to substantially remove light coupling losses arising from at least fiber truncation, mode mismatch and spherical aberration, the contour shape of said microlens comprises substantially a hyperboloid of revolution, is described by the following expression:

$$\frac{\left[z + \left(\frac{n_2}{n_1 + n_2}\right)f\right]^2}{\left(\frac{n_2}{n_1 + n_2}\right)^2 f^2} - \frac{\rho^2}{\left(\frac{n_1 - n_2}{n_1 + n_2}\right)f^2} = 1$$

wherein z is a lens axial coordinate, $n_1$ and $n_2$ are each the index of refraction of the material of the lens and of the medium surrounding the lens, respectively, $\rho$ is the axial coordinate and f is the focal distance of this lens defined by the following expression:

$$f = \frac{\pi \omega_0 \omega_1^2}{\lambda \sqrt{\omega_1^2 - \omega_0^2}}$$

wherein $\omega_0$ is a mode radius of the optical device, $\omega_1$ is a mode radius of the optical fiber and $\lambda$ is a wavelength of the optical power being coupled.

15. The coupling process of claim 14, in which said optical device is selected from the group of optical devices consisting of lasers, semiconductor amplifiers, optical fiber amplifiers and pump sources for fiber amplifiers.

16. The coupling process of claim 15, in which said optical device is a laser.

17. The coupling process of claim 14, in which said mode radius $\omega_0$ of the optical device is equal to 1 $\mu$m, and said mode radius $\omega_1$ of the optical fiber is equal to 5 $\mu$m.

18. The coupling process of claim 14, wherein said microlens comprises a convex end portion of the optical fiber, the contour of the said convex end portion of the fiber comprising substantially the hyperboloid of revolution.

19. The coupling process of claim 18, wherein the optical fiber comprises a core and a cladding, and wherein substantially the entire core portion of the convex end portion of the fiber comprises substantially the hyperboloid of revolution.

20. The coupling process of claim 19, wherein at least a part of the cladding portion of the convex end portion of the fiber comprises substantially a portion of the hyperboloid of revolution.

21. The coupling process of claim 14, in which said removal results in coupling efficiency exceeding 70 percent of the optical power being coupled.

22. The coupling process of claim 14, in which said removal results in coupling efficiency of about 90 percent of the optical power being coupled.

23. The coupling process of claim 14, in which said removal of coupling losses further includes provision of an anti-reflection coating on the microlens to substantially remove Fresnel reflections of the microlens.

24. The coupling process of claim 14, in which the wavelength, $\lambda$, of the optical power being coupled is within a range of from 0.8 to 1.6 $\mu$m.

25. The coupling process of claim 24, in which said operating wavelength $\lambda$ is equal to 1.3 $\mu$m.

26. The coupling process of claim 14, in which said coupling is effected between the optical fiber and an optical device.

27. The coupling process of claim 14, in which said mode radius $\omega_0$ of the optical device is equal to 1 $\mu$m, the mode radius $\omega_1$ of the optical fiber is equal to 5 $\mu$m, the operating wavelength $\lambda$ of the light energy being coupled is equal to 1.3 $\mu$m, and the focal length of the microlens is $\approx$12 $\mu$m.

28. A process for fabricating an optical fiber microlens capable of improved light power coupling efficiency, which comprises (a) selecting a contour shape of a microlens suitable for coupling light power of a certain operating wavelength, $\lambda$, between an optical device with a mode radius $\omega_0$ and an optical fiber with a mode radius $\omega_1$, said contour shape being selected so as to substantially remove light coupling losses arising at least from fiber truncation, mode-mismatch, and spherical aberration, and (b) shaping an end portion of an optical fiber into a convex shaped form having said contour shape, the contour of the said convex end portion of the fiber comprises substantially a hyperboloid of revolution which is described by the following expression:

$$\frac{\left[z + \left(\frac{n_2}{n_1 + n_2}\right)f\right]^2}{\left(\frac{n_2}{n_1 + n_2}\right)^2 f^2} - \frac{\rho^2}{\left(\frac{n_1 - n_2}{n_1 + n_2}\right)f^2} = 1$$

wherein z is a lens axial coordinate, $n_1$ and $n_2$ are each the index of refraction of the material of the lens and of the medium surrounding the lens, respectively, $\rho$ is the axial coordinate and f is the focal distance of this lens defined by the following expression:

$$f = \frac{\pi \omega_0 \omega_1^2}{\lambda \sqrt{\omega_1^2 - \omega_0^2}}$$

wherein $\omega_0$ is a mode radius of the optical device, $\omega_1$ is a mode radius of the optical fiber and $\lambda$ is a wavelength of the optical power being coupled.

29. The fabricating process of claim 28, in which the wavelength, $\lambda$, of the optical power being coupled is within a range of from 0.8 to 1.6 μm.

30. The fabricating process of claim 29, in which said operating wavelength $\lambda$ is equal to 1.3 μm.

31. The fabricating process of claim 28, in which said mode radius $\omega_0$ of the optical device is equal to 1 μm, and said mode radius $\omega_1$ of the optical fiber is equal to 5 μm.

32. The fabricating process of claim 28, in which said mode radius $\omega_0$ of the optical device is equal to 1 μm, the mode radius $\omega_1$ of the optical fiber is equal to 5 μm, the operating wavelength $\lambda$ of the light energy being coupled is equal to 1.3 μm, and the focal length of the microlens is ≃12 μm.

33. The fabricating process of claim 28, in which said shaping of the microlens is conducted by laser micromachinning the end portion of said optical fiber, said shaping being effected by ablating the material of the end portion of the optical fiber by means of a laser beam.

34. The fabricating process of claim 28, wherein the optical fiber comprises the core and a cladding, and wherein substantially the entire core portion of the convex end portion of the fiber comprises substantially a hyperboloid of revolution.

35. The fabricating process of claim 34, wherein at least part of the cladding portion of the convex end portion of the fiber comprises substantially a portion of the hyperboloid of revolution.

36. The fabricating process of claim 28, in which said removal results in coupling efficiency exceeding 70 percent of the optical power being coupled.

37. The fabricating process of claim 28, in which said removal results in coupling efficiency of about 90 percent of the optical power being coupled.

38. The fabricating process of claim 28, in which said removal of coupling losses further includes provision of an anti-reflection coating on the microlens to substantially remove Fresnel reflections of the microlens.

39. The fabricating process of claim 28, in which said optical device is selected from the group of optical devices consisting of lasers, semiconductor amplifiers, optical fiber amplifiers and pump sources for fiber amplifiers.

40. The fabricating process of claim 28, in which said optical device is a laser.

41. The fabricating process of claim 33, in which said laser micromachinning is conducted by means of a pulsating laser beam with an angle of incidence on the said end portion being $0 < \theta < 90°$.

* * * * *